Sept. 29, 1970   H. JAHNKE   3,531,150
ELECTROSTATIC CONDITIONING ARRANGEMENT
Filed June 5, 1968

Inventor:
Herbert Jahnke

By: Michael S. Striker
Attorney

United States Patent Office 3,531,150
Patented Sept. 29, 1970

3,531,150
ELECTROSTATIC CONDITIONING
ARRANGEMENT
Herbert Jahnke, Unterthingau, Allgau, Germany, assignor to Constantin Graf von Berckheim, Weinheim an der Bergstrasse, Germany
Filed June 5, 1968, Ser. No. 734,639
Claims priority, application Germany, June 6, 1967, B 71,299
Int. Cl. B60r 18/00
U.S. Cl. 296—1
14 Claims

ABSTRACT OF THE DISCLOSURE

An arrangement for electrostatically conditioning the air in the passenger compartment of a motor vehicle includes an electrode which is mounted on the ceiling of the passenger compartment electrically insulated from the body of the vehicle. A source of direct current supplies between 90 and 150 volts and is conductively connected to the electrode with one of its poles whereas its other pole is actively connected to mass. At least one of the various interior surfaces in the compartment with which a passenger comes into contact, such as the surfaces of the seats or the steering wheel of the vehicle is electrically conductive and is conductively connected to mass.

CROSS-REFERENCES TO RELATED APPLICATIONS

Related applications are currently co-pending under the name of Herbert Jahnke and under Ser. No. 708,207 ("Electrostatic Arrangement") which was filed on Feb. 26, 1968, and now Pat. No. 3,483,672, and Ser. No. 714,288 ("Ion-Producing Device") which was filed on Mar. 19, 1968.

BACKGROUND OF THE INVENTION

The present invention relates generally to an electrostatic conditioning arrangement, and more particularly to an arrangement for electrostatically conditioning the air in vehicles, especially in the passenger compartments of motor vehicles.

There are various reasons why it is desirable to electrostatically condition the air in the passenger compartments of vehicles, particularly motor vehicles. The most important one of these is the fact that such conditioning has a beneficial influence on persons in such passenger compartments, particularly in delaying the development of fatigue. This is especially important where the operator of a motor vehicle is concerned because fatigue brings with in an increase in reaction time which is dangerous, so that the delay in the onset of fatigue is a valuable contribution to traffic safety. Another important reason for providing such arrangements is the fact that they eliminate, at least to a certain extent, contaminants and odors from the air in the passenger compartment.

Arrangements which are known are electrostatic conditioning purposes for stationary installations, namely for use in homes and places of business, have shown that the human organism is beneficially influenced if an electrostatic field of a strength up to substantially 1500 v./m. is provided. Taking into account the spacing between the field-establishing electrodes, e.g. a ceiling electrode and a floor electrode in the room whose air is to be conditioned, the source of direct current which energizes the electrodes must provide several thousand volts (v.) in order to establish a field of this strength. Attempts have been made to incorporate such arrangements in vehicles. However, in view of the necessary high voltage these attempts have met with difficulties which heretofore have made it impossible or impractical to utilize such arrangements in vehicles. On the one hand it is necessary to protect the passengers against contact with the high-voltage potential which is a difficult and expensive undertaking, particularly if the arrangement is to be installed in an existing vehicle rather than to be incorporated during the manufacture of the vehicle at the factory. On the other hand, the device for providing the necessary high direct current in a vehicle is expensive and must utilize an oscillator whose use results in development of electrical phenomena which are usually undesired and frequently not tolerable.

It is thus a general object of the present invention to provide an arrangement of the type here under discussion which is not subject to the aforementioned disadvantages.

A more particular object of the invention is to provide such an arrangement which eliminates the need for use of a device producing high voltage, and which also eliminates the need for high-voltage insulation, thus being simple and inexpensive to construct and being capable of incorporation in existing vehicles without any difficulties.

SUMMARY OF THE INVENTION

In pursuance of these objects, and others which will become apparent hereafter, one feature of my invention resides in providing a vehicle whose body surrounds a passenger compartment having a ceiling and a plurality of interior surfaces which are arranged to be contacted with a passenger, an arrangement for establishing an electrostatic field which comprises an electrode mounting on the ceiling and electrically insulated therefrom and a source supplying between 90 and 150 volts direct current and having a first pole which is conductively connected to the electrode and a second pole which is conductively connected to mass. Electrically conductive means is provided on at least one of the interior surfaces which is arranged to be contacted by a passenger, and this electrically conductive means is conductively connected to mass also.

By resorting to such an arrangement as just outlined the body of a passenger is connected to mass through contact with the electrically conductive means mentioned above, so that the body of the passenger itself constitutes the counter electrode to the ceiling electrode. This being the case, and the spacing between the head of the passenger and the ceiling electrode being small, the need for high voltages is eliminated and a voltage between 90 and 150 v. suffices to obtain between the ceiling electrode and the passenger whose body functions as a counter electrode, an electrostatic field of the desired strength, for instance 1500 v./m. In view of the fact that no significant current flow is necessary, the conductivity of the human body and/or the articles of clothing, as well as the conductivity of the electrically conductive means provided on the surfaces contacted by the passenger, need not be very good and it is sufficient if this conductivity is higher than that of the ambient air in the compartment by only 1 or several decimal powers. The low voltages employed require relatively little insulation and this of course reduces further the expense and complexity of the arrangement. Because the body of the passenger is connected to mass potential, no static charges can develop of the type which are usually found resulting from friction of the body with plastic components of the vehicle.

In view of the fact that the required potential of the source is low, the source may be a high-voltage battery consisting of a plurality of connected cells. This results in the provision of the desired potential without the necessity of transforming and rectifying the current via an oscillator, and also without the development of undesirable electrical phenomena.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
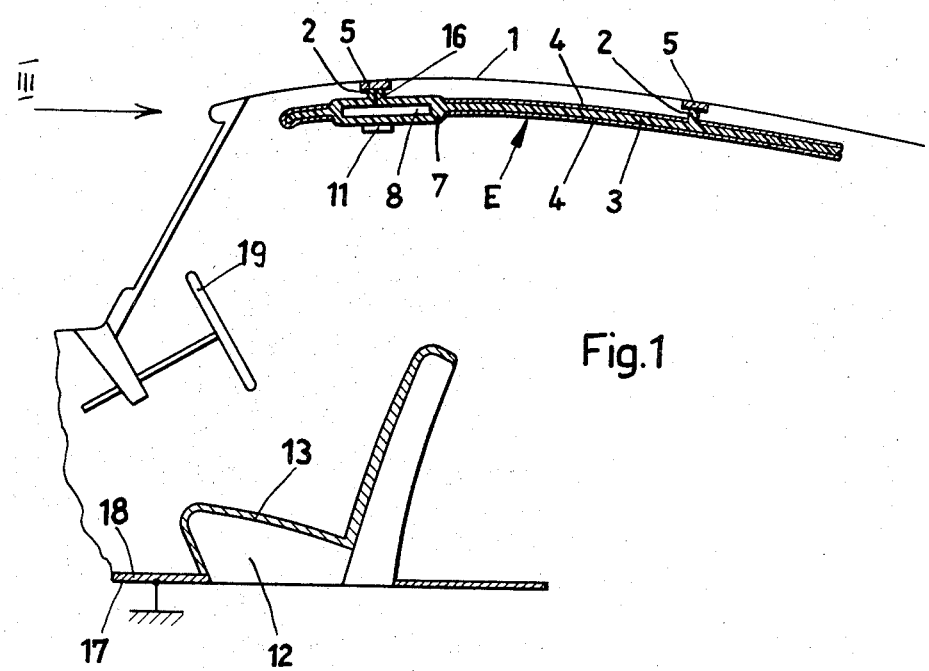
FIG. 1 is a fragmentary, somewhat diagrammatic longitudinal section through the passenger compartment of a vehicle provided with the arrangement according to the present invention.
Figure 2:
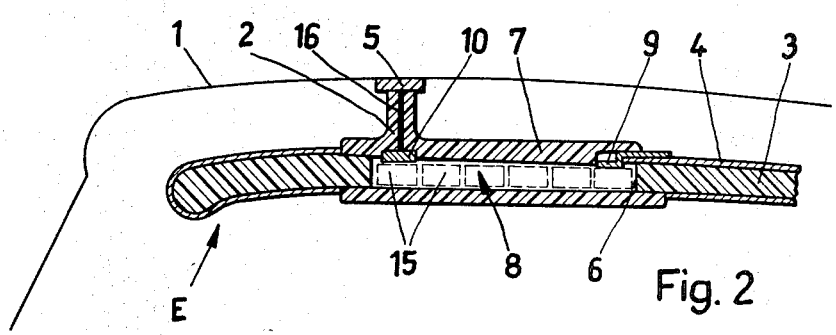
FIG. 2 is a fragmentary enlarged view of FIG. 1.

Discussing now the drawing in detail it will be appreciated that I have illustrated only one exemplary embodiment which is not to be considered limiting in any way. In FIG. 1, I have shown a portion of the passenger compartment of a motor vehicle, with vehicle components not essential for an understanding of the invention having been omitted. The roof of the passenger compartment is identified with reference numeral 1 and it will be seen that suspended from the roof 1 in the interior of the passenger compartment is a ceiling electrode which is identified in its entirety with reference designation E. The electrode E is mounted on the roof 1 by means of supporting members 2 consisting of electrically insulating material. As FIG. 2 shows more clearly, the electrode E consists of a carrier member of generally plate-shaped configuration, identified with reference numeral 3. The carrier member 3 of electrically insulating material and the term generally plate-shaped configuration is to be understood as including strip-shaped outlines. At least one of the two major surfaces of the carrier member 3 is provided with an electrically conductive layer, cover or coating 4. Advantageously, both of these major surfaces are thus provided, but if only one is provided with this layer 4, then it must be the major surface facing away from the ceiling 1, that is facing towards the interior of the passenger compartment. The support members 2 of insulating material are not mounted directly on the ceiling 1 in the illustrated embodiment, but rather are connected to metallic supports 5 which are mounted directly on the ceiling 1, or in very small spacing therefrom, and which extend transversely of the longitudinal extension of the vehicle. The members 5 may advantageously extend into the upper lateral edges 14 of the vehicle, as shown in FIG. 3.

In the illustrated embodiment, which I have found to be very advantageous, the carrier member 3 of the electrode E is provided with a cut-out 6 in which the battery 8 constituting the source of current is received. As shown in FIGS. 1 and 2, a casing 7 of electrically insulating material is mounted in the cut-out 6 of the carrier member 3 and accommodates in its interior a high-voltage battery 8 which, as FIG. 2 shows, advantageously consists of a plurality of electrically connected discrete battery cells 15 located side-by-side in the general plane of the cut-out 6. Thus, the battery including the casing requires very little space and is, in fact, substantially accommodated within the confines of the cut-out 6, adding very little to the thickness of the electrode E. One pole of the battery 8 is in direct current-conducting contact with the actively conductive layer 4 of the electrode E, in the illustrated embodiment via a spring-contact 9 as shown in FIG. 2, and the other pole of the battery 8 is provided with a contact 10 (compare FIG. 2) which in turn is connected with one of the members 5 through a conductor 16 extending, in the illustrated embodiment, through a suitable passage in one of the support members 2. In the illustrated embodiment, and as clearly shown in FIG. 2, it is the casing 7 for the battery which in itself is an insulating carrier for the electrode E in that the support member 2 of insulating material, through which the conductor 16 extends which connects the contact 10 with mass, is an integral part of the casing 7. Of course, other arrangements are possible.

Figure 3:
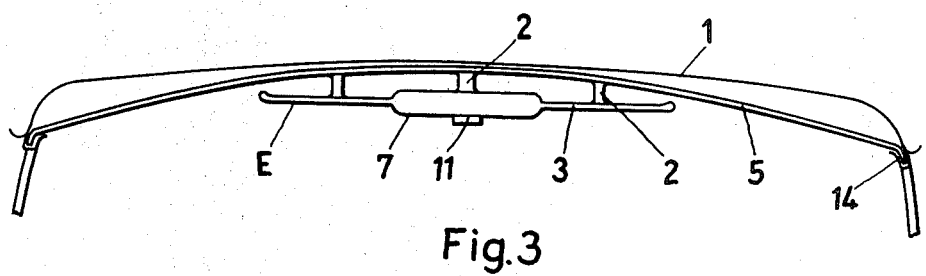
FIG. 3 is a diagrammatic front view of the embodiment illustrated in FIG. 1 as seen in the direction of the arrow III shown in FIG. 1.

If desired, it is possible to provide a step-switch 11 which is shown in FIGS. 1 and 3 in diagrammatic form and which may be of any well known type. This step-switch 11 may be operatively associated with the battery 8 and the electrode E in such a manner that the potential supplied by the battery 8 can be varied at the will of the passenger in the passenger compartment, for which purpose the switch 11 must of course be accessible to the passenger.

The vehicle seats 12, of which only one is shown by way of example, are provided with an electrically conductive covering, seat cover or the like 13, and the floor of the vehicle in the passenger compartment, identified with reference numeral 17, is provided with a similarly electrically conductive covering 18. Both the covering 13 and the covering 18 are electrically conductively connected with mass. It will be appreciated, of course, that the coverings 13 and 18 need not be electrically conductive in the entirety and that it would be sufficient if only their respective surfaces coming into contact with the body of a passenger, are electrically conductive. The steering wheel 19 may be similarly provided with a surface covering which is electrically conductive and connected with mass, or it may be electrically conductive in its entirety and connected with mass.

FIG. 3, which is a view of FIG. 1 in the direction of the arrow III, shows that it is possible to construct the electrode E in strip-shaped configuration. It is then advantageous to have the electrode extend longitudinally of the passenger compartment along the center line thereof, that is between the seats which are located at opposite lateral sides of the center line. While this arrangement of seats is not specifically illustrated, it will be readily understood because it is of course conventional. An arrangement of this type, which is illustrated in the drawing, results in such a positioning of the electrode E that the same will not interfere with the head of a passenger seated in the respective seats. Evidently, this arrangement provides greater latitude in determining the spacing of the electrode E from the ceiling 1 than another arrangement might provide in which the electrode would be configurated differently. Of course, various modifications of the construction illustrated in the drawing are possible and will offer themselves readily to those skilled in the art. Thus, to make the arrangement readily usable with vehicles whose passenger compartments are differently sized and configurated, the members 2 may for instance be constructed telescopically, and similarly the members 5 may be constructed telescopically or in an analogous manner allowing size variations. Suitable arresting means would then have to be provided to arrest them at their selected positions.

It will also be appreciated that the various components of the novel arrangement herein disclosed, particularly the carrier member 3, may consist for safety reasons of a shock-absorbing deformable or resiliently yieldable material to avoid or reduce the danger of injury in case of accident. It will also be appreciated that the construction of the battery 8 may be accomplished in well known manner, and that the individual cells 15 may be connected with one another in the well known manner. For this reason the battery 8 has been indicated only diagrammatically in the drawing.

If it is desired to ionize the air in the passenger compartment, then the arrangement may be further provided with an ionizing device which may for instance be located in the fresh-air intake supplying the passenger compartment with fresh air. Devices for this purpose are already known, for instance of the type set forth in the aforementioned co-pending application Ser. No. 714,288. The high voltage for operating such devices may be supplied in suitable manner, for example from the ignition coil of the vehicle.

It will be understood that each of the elements described above, or two or more together, may also find a useful application in other types of constructions differing from the types described above.

While the invention has been illustrated and embodied in an electrostatic conditioning arrangement for motor vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims.

What is claimed is:

1. In a vehicle, particularly in a motor vehicle, including a passenger compartment having a plurality of interior surfaces arranged to be contacted by the body of a passenger and a ceiling arranged to be proxmal to the head of the passenger, an arrangement for establishing an electrostatic field and comprising, in combination, an electrode mounted on said ceiling electrically insulated therefrom; a source supplying between 90 and 150 v. direct current and having a first pole conductively connected to said electrode and a second pole conductively connected to mass; and electrically conductive means provided on at least one of said interior surfaces and being conductively connected to mass so that an electrostatic field develops between the head of the passenger and said electrode in response to contact of the body of the passenger with said electrically conductive means.

2. In a vehicle as defined in claim 1, wherein said source is a high-voltage battery comprising a plurality of connected discrete cells.

3. In a vehicle as defined in claim 1, wherein said source is a high-voltage battery, and wherein said battery and said electrode together constitute a unitary assembly.

4. In a vehicle as defined in claim 3, further comprising a plurality of electrically insulating members mounting said electrode on said ceiling; and a conductor connected with said second pole and with mass and extending through one of said insulating members.

5. In a vehicle as defined in claim 1, wherein said source is a high-voltage battery mounted on said electrode.

6. In a vehicle as defined in claim 5, wherein said compartment has a front and a rear and includes at least two seats located laterally of a center-line extending from the front to the rear; and wherein said electrode is strip-shaped and extends substantially along said centerline between the front and the rear of said compartment intermediate said seats so as not to interfere with passengers seated in the latter.

7. In a vehicle as defined in claim 5, wherein said electrode is of substantially plate-shape configuration and provided with a cut-out, and wherein said battery is received and mounted in said cut-out.

8. In a vehicle as defined in claim 7, a carrier member consisting of electrically insulating material and having a first side facing said ceiling and a second side facing the interior of said passenger compartment, and an electrically conductive layer provided at least on said second side, said cut-out being provided in said carrier member.

9. In a vehicle as defined in claim 8, wherein said carrier member consists of a shock-absorbing deformable material.

10. In a vehicle as defined in claim 8, said battery comprising a casing of electrically insulating material received within the confines of said cut-out in said carrier member and secured to the latter.

11. In a vehicle as defined in claim 10, and further comprising a plurality of electrically insulating members mounting said electrode on said ceiling, at least one of said insulating members being integral with said casing of said battery.

12. In a vehicle as defined in claim 10, said cut-out and said casing received therein having a general plane, and said battery comprising a plurality of connected discrete cells located in said casing so as to be arranged in said general plane.

13. In a vehicle as defined in claim 10, and further comprising a step-switch associated with said battery and said electrode and operative for varying the voltage potential supplied by the former to the latter.

14. In a vehicle as defined in claim 13, wherein said step-switch is mounted on said battery casing accessible to a passenger in the interior of said compartment.

References Cited

UNITED STATES PATENTS 3,311,108   3/1967   Cristofv et al. _____ 55—101 X

FOREIGN PATENTS 626,387   4/1963   Belgium.
816,463   5/1937   France.
976,815   11/1950   France.

OTHER REFERENCES

DAS 1, 063, 293, German printed application, August 1959, Kristall.

BENJAMIN HERSH, Primary Examiner

J. A. PEKAR, Assistant Examiner

U.S. Cl. X.R.

55—2, 101, 148, 154, 385; 128—419; 296—63